United States Patent

[11] 3,614,730

| [72] | Inventor | Michael Bozoian<br>Ann Arbor, Mich. |
|---|---|---|
| [21] | Appl. No. | 49,691 |
| [22] | Filed | June 25, 1970 |
| [45] | Patented | Oct. 19, 1971 |
| [73] | Assignee | Ford Motor Company<br>Dearborn, Mich. |

[54] ENGINE COOLANT LEVEL WARNING SYSTEM
9 Claims, 3 Drawing Figs.

[52] U.S. Cl. .................................................. 340/59,
340/244, 315/129
[51] Int. Cl. .................................................. B60q 1/00
[50] Field of Search .................................................. 340/52, 59,
244, 282; 315/129, 194; 73/290

[56] References Cited
UNITED STATES PATENTS

| 2,477,511 | 7/1949 | Comb | 340/59 UX |
| 3,257,643 | 6/1966 | Jensen | 340/52 |
| 3,401,373 | 9/1968 | Risner | 340/52 |
| 3,534,352 | 10/1970 | Gallagher | 340/59 X |

*Primary Examiner*—Alvin H. Waring
*Attorneys*—John R. Faulkner and Keith L. Zerschling ABSTRACT: A system for indicating lack of or severe reduction of coolant flow through a coolant system for an internal combustion engine that warns the vehicle operator of catastrophic failure or loss of fluid in the engine cooling system, as well as apprising the operator that the engine coolant thermostat has opened. A metal band, for example, a hose clamp, is placed on one of the radiator hoses, preferably the upper hose, and a signal generator generating a high-frequency electrical signal is coupled to this metal band. An indication means in the form of a lamp driver circuit and a warning lamp is also connected to the metal band. When coolant is flowing through the radiator hose, the capacitance between the metal band and the engine is at a predetermined level, but when flow of coolant through the hose is reduced substantially, the capacitance is reduced substantially. This change of capacitance is sensed by the lamp driver circuit and will cause the warning lamp coupled to the lamp driver circuit to become illuminated when coolant flow through the radiator hose is at a low or nonexistent level.

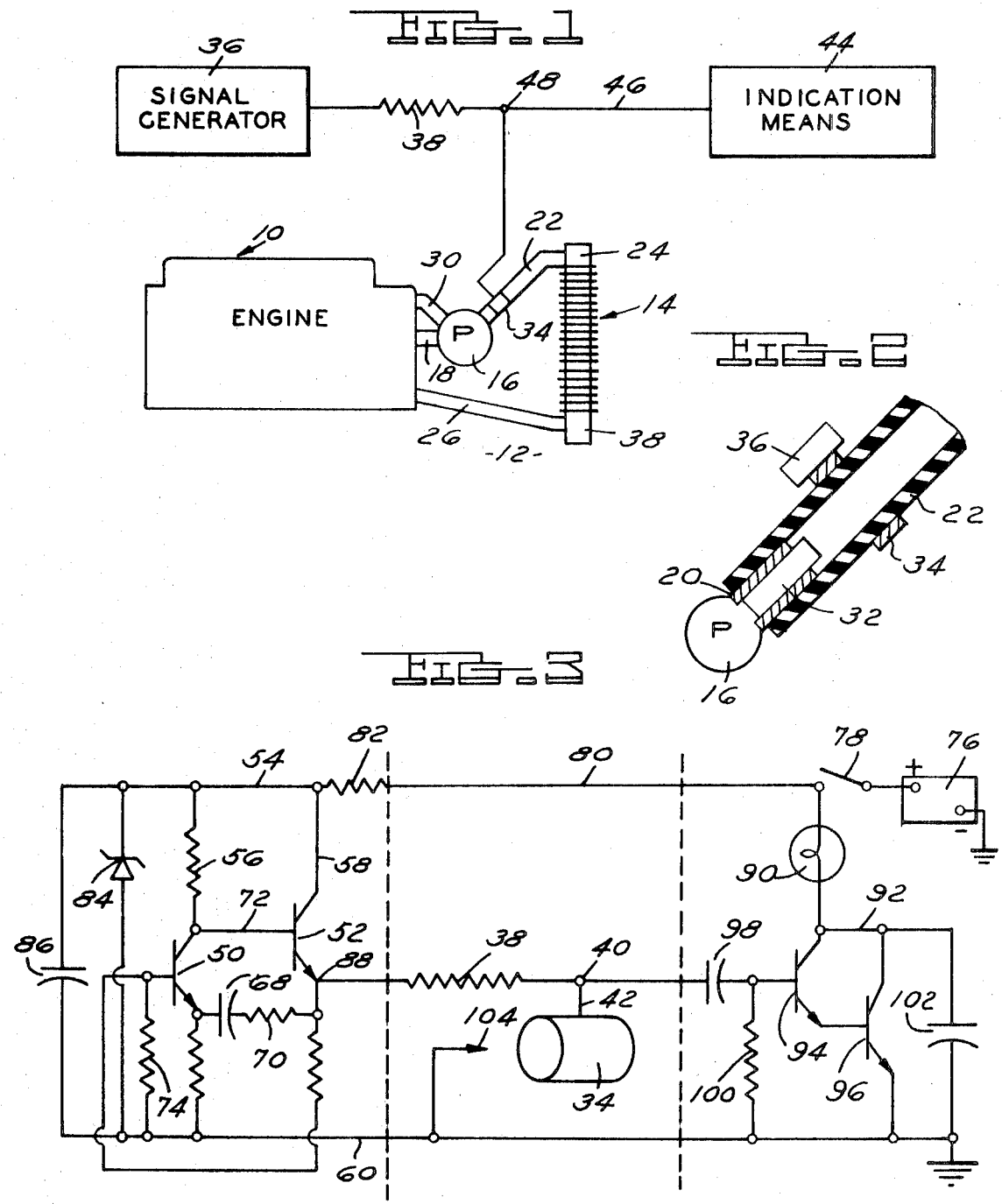

ENGINE COOLANT LEVEL WARNING SYSTEM

BACKGROUND OF THE INVENTION

This invention relates to an engine coolant condition monitor for an internal combustion engine and, more particularly, to such a monitor that will inform the vehicle operator promptly of catastrophic loss of engine coolant and will also apprise him when the engine coolant thermostat opens.

In conventional internal combustion engines currently being produced, a thermostatic switch is employed to sense the temperature of the engine coolant. In order to operate properly, this switch must be positioned in heat exchange relationship with respect to the engine coolant, and it closes when the engine temperature reaches a predetermined high or dangerous level. When this occurs, an electrical circuit is completed through a warning lamp to apprise the vehicle operator of the high temperature condition in the engine coolant. While such a system is satisfactory to apprise the vehicle operator of overheating conditions and high engine temperatures, its response time is too slow to apprise him of a catastrophic loss of engine coolant in sufficient time for him to shut down the engine prior to severe overheating that may cause seizure and severe damage to the internal combustion engine. This issue since the thermostatic switch requires for its operation that it be in heat exchange relationship to the engine coolant. If the engine coolant is lost, however, the thermostatic switch will not respond promptly to inform the vehicle operator of this condition and the attendant high temperatures generated in the engine by the loss of the coolant.

The proper time for the vehicle operator to initiate the operation of a vehicle heating system that operates on engine coolant is when the engine coolant has come up to a proper temperature and the engine coolant thermostat opens. The extinguishing of the "cold" indicator lamp in current vehicles may have little correlation with engine coolant thermostat opening. The flow of fluid through the coolant system of an internal combustion engine is totally restricted, are restricted in large measure, prior to the time that the thermostat opens, i.e. when the engine coolant temperature has reached a predetermined level, for example, 160° or 180° F. With the present system at all times prior to thermostat opening, the indicator lamp or warning lamp associated with the system will be energized and, as soon as the thermostat opens to permit fluid flow through the coolant system, the present invention senses this coolant flow and turns off the warning lamp or other warning means.

SUMMARY OF THE INVENTION

The present invention senses a change in the capacitance between a metal band, for example, a radiator hose clamp positioned about one of the nonconductive hoses in an internal combustion engine coolant system, and ground which may be the block of the engine, that occurs between the conditions of normal coolant flow through the coolant system and the lack of or severe curtailment of such flow.

A signal generator, for example, a solid-state oscillator that produces a sine wave having a frequency on the order of 200 to 250 kilohertz, is connected to the metal band. This signal generator and the metal band are also connected to the input of a solid-state lamp driver circuit. This solid-state lamp driver circuit is of the self-rectifying type so it rectifies the AC signal being fed to it from the signal generator and the metal band. A warning means, preferably in the form of an incandescent lamp, is connected to the lamp driver so that the warning means or lamp will be energized when the lamp driver circuit is in a conducting state.

The metal band and the engine provide a capacitive circuit connected in parallel with the input of the solid-state driver. When the capacitance between the metal band and the engine is at a predetermined level, caused by normal coolant flow through the engine coolant hose about which the metal band is positioned, the capacitive reactance of the capacitive circuit is sufficiently low that the resulting signal into the driver circuit is insufficient to switch it to a conducting state. The lamp or other warning means, therefore, remains unenergized. If, however, the fluid flow through this hose decreases due to a large loss of engine coolant, the capacitance between the metal band and the engine block is reduced sharply, for example, it may be reduced from 150 to 30 u.u.f., or a reduction of 1/5 the normal value. This increases the capacitive reactance of the capacitive circuit comprised of the metal band and the engine and, therefore, increases the signal applied to the input of the solid-state driver circuit. As a result, the driver circuit is switched to a conducting state and the warning means or lamp is energized to apprise the driver of a loss of engine coolant.

This system will also apprise the vehicle operator of the opening of the thermostat positioned in tHe engine coolant system. When the internal combustion engine is first started and the engine coolant is in a cold condition, the thermostat in the system will remain closed thereby preventing or severely restricting the flow of engine coolant through the radiator of the vehicle. When the thermostat is closed, there will be little, if any, coolant flow through the hose about which the metal band is positioned. Consequently, the capacitive reactance of the capacitive circuit, comprised of the metal band and the engine, will be high and a sufficient signal will be applied to the solid-state driver circuit to energize the warning lamp or means. This will apprise the vehicle driver that the thermostat is closed and that the engine coolant has not come up to a temperature sufficient to supply a satisfactory amount of heat to the interior of the vehicle.

When the thermostat opens, the capacitive reactance between the metal band and the engine lowers sufficiently that a signal, of a magnitude to maintain the solid-state driver circuit in a conductive state, is no longer available. As a result, the warning lamp or other warning means is deenergized and this apprises the vehicle operator that the engine coolant is at a temperature sufficient to provide a satisfactory amount of heat to the interior of the vehicle.

An object of the present invention is the provision of an engine coolant condition monitor that will apprise the vehicle operator promptly of a catastrophic loss of engine coolant from an internal combustion engine.

Another object of the invention is the provision of an engine coolant condition monitor that will apprise the vehicle operator of the opening of the thermostat positioned in an engine coolant system.

Other objects and attendant advantages of the present invention will become more readily apparent as the specification is considered in connection with the drawings.

BRIEF DESCRIPTION OF THE DRAWINGS

FIG. 1 is a block diagram of the engine coolant system and monitor of the present invention;

FIG. 2 is a sectional view, partially in elevation, taken along the lines 2—2 of FIG. 1; and FIG. 3 is a circuit diagram of the engine coolant condition monitor of the present invention.

DESCRIPTION OF THE PREFERRED EMBODIMENT

Referring now to the drawing in which like reference numerals designate like parts throughout the several views thereof, there is shown an internal combustion engine 10 having a cooling system generally designated by the numeral 12. The cooling system 12 includes a radiator 14 and an engine-driven pump 16. The pump 16 is provided with an intake port 18, which in turn is connected to the cooling passages in the block and head of the internal combustion engine 10, and an outlet port 20 which is connected to a radiator conduit or hose 22. This radiator hose is connected at the other end to the upper radiator tank 24 of the radiator 14. A return conduit or hose 26 is connected to the lower radiator tank 28 at one end and to the coolant passages in the head and block of the engine 10 at the other end. A bypass line or conduit 30 also connects an outlet port of the pump 16 to the cooling passages in the block and/or head of the engine 10.

As shown more specifically in FIG. 2, the outlet port 20 of the pump 16 has a conventional thermostat 32 positioned therein which is closed when the temperature of the engine coolant is below some predetermined level, for example, 160° or 180° F. After the temperature of the coolant is raised above this level by heat exchange with the engine, the thermostat 32 opens. Thus, prior to the time that the thermostat 32 opens, the pump 16 operates to send engine coolant from the intake port 18 into the conduit 30 thereby recirculating engine coolant through the engine coolant passages positioned in the block and/or head of the internal combustion engine 10.

When the thermostat opens, engine coolant is pumped from the outlet port 20 of the pump 16 through the thermostat 32, through the conduit or hose 22 and into the upper tank 24 of the radiator. From there, the fluid flows vertically downwardly through the radiator 14, where it is cooled, and into the lower tank or reservoir 28 where it is pumped by the pump 16 into the coolant passages in the block and head of the engine 10 via the lower conduit or hose 26.

The upper radiator conduit or hose 22 is of conventional construction, that is, it is constructed of a nonconductive flexible material. A cylindrical conductive band 34, which may be in the form of a radiator hose clamp, is positioned around the conduit or house 22 about midway between the outlet port 20 of the pump 16 and the upper reservoir or tank 24 of the radiator 14. A signal generator 36 applies an alternating current signal to the cylindrical conductive band 34 via a resistor 38, junction 40 and lead 42. The junction 40 is also connected to an indication means 44 via lead 46. The signal generator 36 produces an alternating current signal which is preferably a substantially pure sine wave having a frequency from 200 to 250 kilohertz. The frequency is selected in this range so as not to interfere with the operation of the vehicle's AM radio.

The signal generator 36 preferably takes the form of an integrated circuit, as shown more specifically in FIG. 3. It is preferably packaged so that it rests or is supported by the conductive cylindrical band 34, and this particular packaging arrangement is shown in FIG 2.

The signal generator 36, as shown in FIG. 3, comprises a first solid-state active device, preferably in the form of transistor 50, and a second solid-state active device, preferably in the form of transistor 52. The transistors 50 and 52 are preferably of the same conductivity type and have their collectors connected to line 54 through a resistor 56 and a lead 58, respectively. The emitter of transistor 50 is connected to grounded line 60 through a resistor 62 and the emitter of transistor 52 is connected back to the control electrode or base of transistor 50 via a series circuit comprised of resistor 64 and lead 66. The emitters of transistors 50 and 52 are connected together via a series circuit comprised of capacitor 68 and resistor 70, while the collector of transistor 50 is connected to the control electrode or base of transistor 52 via lead 72. In addition, the base of transistor 50 is connected to grounded line 60 via resistor 74.

The line 54 is energized from a source of direct current electrical energy, for example, storage battery 76, via ignition switch 78, lead 80 and resistor 82. A zener diode 84 is connected across line 54 and grounded line 60 to provide a voltage-limiting device which limits the voltage or potential difference between the lines 54 and 60 to some predetermined value, for example, 10 volts, if the electrical storage battery 76 is a 12-volt electrical storage battery. This zener diode 84, as a result, controls or limits the magnitude of the AC voltage produced by the signal generator or oscillator 36. In addition, a transient suppression capacitor 86 is connected between lines 54 and 60 to filter out any high-frequency transients that may appear on the line 54.

It can be readily appreciated from the above description that the signal generator 36 is comprised of a stable high-frequency RC sinusoidal oscillator which has a frequency determined by the single resistor 70-capacitor 68 series circuit connected between the emitter of the two transistors 50 and 52. The output of this oscillator is fed from the emitter of transistor 52 back into the base or control electrode of transistor 50 via resistor 64 and lead 66. The output of this signal generator or oscillator also appears at the junction 88 connected to the emitter of transistor 52, and is fed to the conductive band 34 via the resistor 38 and the lead 42, as described above.

The indication means 44 is comprised of a warning means or warning lamp 90, having one terminal connected to the line 80 and the other terminal connected to a line 92. This line 92 is in turn connected to the collectors of a rectifier-driver transistor 94 and an output or power transistor 96. The control or base electrode of the rectifier-driver transistor 94 is connected to the junction 40 via lead 46 and a coupling capacitor 98 and is also connected to grounded line 60 via resistor 100. The emitter of the rectifier-driver transistor 94 is connected to the control or base electrode of the output or power transistor 96 and the emitter of this output or power transistor 96 is connected to ground via grounded line 60. Additionally, a storage or filter capacitor 102 is connected across the output circuit of the output or power transistor 96 by being connected to the line 92 at one terminal and to the grounded line 60 at the other terminal.

The engine 10 will be at ground potential and, hence, its potential is at the same potential as grounded line 60 shown in FIG. 3. The flow of engine coolant is represented here by the arrow 104.

OPERATION

When the ignition switch 78 is closed, the source of electrical energy 76 will energize line 80 and line 54 through resistor 82. The energization of line 54 will cause the signal generator 36 to commence operation, and it will produce, at the output junction 88, an alternating current sinusoidal signal having a frequency in the order of 200 to 250 kilohertz. This signal, as previously stated, is applied to the conductive band 34 via resistor 38, junction 40 and lead 42. Simultaneously, an alternating current signal is applied to the control or base electrode of transistor 94 of the indicating means 44 via junction 40, lead 46 and coupling capacitor 98.

Prior to the time that the internal combustion engine is in operation and up to the time that the temperature of the liquid coolant reaches the temperature at which the thermostat 32 opens, there will be little, if any, flow of coolant through the upper radiator hose or conduit 22 and, hence, the capacitance between the conductive band 34 and the engine, which is at ground potential, i.e. the potential of line 60, will be low. For example, it has been found in an internal combustion engine that this capacitance is in the order of 30 u.u.f. As a result, the capacitive reactance of the capacitor, comprised of the metal band 34 and the engine 10, will be at a relatively high level so that a major portion of the signal generated by the signal generator 36 is applied to the base of the transistor 94 of the indication means 44 from the junction 40 through the coupling capacitor 98.

The transistor 94 provides self-rectification so that only the positive portion of the alternating current signal, appearing at the control or gate electrode, is applied to the gate or control electrode of the output or power transistor 96 where it is amplified by the output or power transistor 94. The storage or filter capacitor 102 causes the pulsating direct current to be converted into a direct current having some ripple associated with it. As a result, the warning lamp 90 is energized from the source of electrical energy through the output circuit of the power or transistor 96, and this causes the warning lamp 90 to glow thereby indicating to the vehicle operator that there is little, if any, coolant flow through the upper radiator hose 22.

When the engine coolant reaches a temperature sufficiently high to cause the thermostat 32 to open, coolant will then flow through the upper radiator hose or conduit 22. The fluid causes the capacitance between the conductive band 34 and the engine 10 to rise substantially. For example, it may be increased on the order of 5 times to a value in the neighborhood of 150 u.u.f. As a result of the increase in this capacitance, the capacitive reactance between the conductive metal band and the engine will be lowered substantially thereby draining off a substantial portion of the magnitude of the alternating current signal produced by the signal generator 36. When this happens, the alternating current voltage applied to the base of transistor 94 is not sufficient to maintain the output or power transistor 96 in a sufficiently conducting state to energize the warning means or lamp 90 sufficiently to give a warning indication.

If during the operation of the internal combustion engine 10, a large loss of coolant occurs, for example, by rupture of any of the conduits connecting the engine 10 with the radiator 14 or by the loosening of any of the radiator hose clamps, the amount of fluid, pumped by the pump 16 through the conduit 22 connected to the upper reservoir or tank 24 of the radiator 14, will be reduced substantially. This action lowers substantially the capacitance between the conductive band 34 and the engine 10 and raises the capacitive reactance between these two components to a level sufficient to provide a signal to the indication means 44 sufficient to switch transistor 96 to its conducting state. This action will energize the warning means or lamp 90 thereby warning the vehicle operator promptly of the loss of engine coolant.

It is known that a catastrophic loss of engine coolant will cause the engine to become overheated to the extent where it will seize and become an almost total loss within two or three minutes after the loss of engine coolant. With a conventional thermostatic heat-sensing element to operate a warning means, the loss of fluid also removes the heat exchange medium by which this thermostatic element is operated. As a result, the vehicle operator is not warned in sufficient time of this loss of fluid to prevent this seizure and damage. With the present invention, however, the change in capacitance between the conductive band 34 and the engine 10 occurs simultaneously with this loss of coolant. The warning lamp 90 will be energized immediately and the vehicle operator will be informed promptly. He may, therefore, shut his engine down and prevent the severe damage that might otherwise occur.

Thus, the present invention provides a unique and reliable engine coolant condition monitor or indicator that will apprise the vehicle operator of a catastrophic loss of engine coolant. In addition, it will apprise the vehicle operator when the thermostat of the engine coolant system opens so that he may initiate operation of his vehicle heating system at the proper time.

I claim:

1. In a system for indicating a low level of coolant flowing through an engine coolant system, the combination comprising an engine requiring a liquid coolant, cooling means for cooling the engine coolant, and means including a conduit comprised of a nonconducting material coupling the engine and the cooling means for circulating engine coolant through the engine and the cooling means, a source of electrical energy, means coupled to said source of electrical energy for producing an alternating electrical signal, a warning means coupled to said source of electrical energy, and means coupled to said warning means, said source of electrical energy and to said conduit for sensing coolant flow through said conduit and giving a warning to the vehicle operator when coolant flow through said conduit is at a low level.

2. The combination of claim 1 in which said last-mentioned means comprises a metal band positioned around said conduit, said metal band being electrically connected to said warning means and to said means for producing said alternating electrical signal.

3. The combination of claim 2 in which said means for circulating engine coolant comprises an engine-driven pump coupling said engine and said cooling means comprises a radiator.

4. The combination of claim 1 in which said means coupled to said means for producing an alternating electrical signal, said warning means and to said conduit comprises a conductive band positioned around said conduit.

5. The combination of claim 4 in which said means for circulating engine coolant through said engine and said engine coolant means comprises a pump having an inlet and an outlet, said conduit being connected between the outlet of said pump and said cooling means.

6. The combination of claim 5 in which a thermostat is positioned in said conduit between said outlet of said pump and in a position between said metal band and the outlet of said pump.

7. The combination of claim 1 in which said last-mentioned means comprises a low-pass filter.

8. The combination of claim 1 in which said means for generating an alternating frequency signal comprises a first transistor having emitter and collector output electrodes and an input electrode, a second transistor comprising emitter and collector output electrodes and an input electrode, a series circuit comprised of a capacitor and a resistor connecting the emitter electrodes of said two transistors and a resistive network coupling the emitter electrode of said second transistor with the input electrode of said first transistor, and said means for sensing coolant flow through said conduit is connected to the emitter electrode of said second transistor.

9. The combination of claim 1 and comprising further a first transistor and a second transistor, each of said transistors having an emitter, a collector and a base electrode, said warning means being connected between said source of electrical energy and the collector electrodes of said transistors, said emitter electrode of said first transistor being directly coupled to the base electrode of said second transistor and the emitter electrode of said second transistor being connected to the other terminal of said source of electrical energy, and a capacitor coupling said means for sensing coolant flow and the base electrode of said first transistor.